United States Patent
Lee et al.

(10) Patent No.: US 6,777,483 B2
(45) Date of Patent: Aug. 17, 2004

(54) METHOD OF PREPARING DIENE LATEX HAVING A LARGE PARTICLE SIZE BY ADDITION OF A PRETREATED SEED LATEX TO AN AGGLOMERATING AGENT

(75) Inventors: Byeong-Do Lee, Chunla-namdo (KR); Ki-bo Chang, Chunla-namdo (KR); Kwang-Yeol Lim, Chunla-namdo (KR); Dong-Won Jun, Chunla-namdo (KR)

(73) Assignee: Cheil Industries Inc., Kyungbuk (KR)

( * ) Notice: Subject to any disclaimer, the term of this patent is extended or adjusted under 35 U.S.C. 154(b) by 158 days.

(21) Appl. No.: 10/213,223

(22) Filed: Aug. 6, 2002

(65) Prior Publication Data

US 2002/0198309 A1 Dec. 26, 2002

Related U.S. Application Data

(63) Continuation-in-part of application No. 09/699,311, filed on Oct. 27, 2000.

(30) Foreign Application Priority Data

Aug. 6, 2001 (KR) ......................................... 2001-47252

(51) Int. Cl.$^7$ ............................ C08L 29/04; C08L 31/06
(52) U.S. Cl. ........................ 524/502; 524/524; 524/458; 524/460
(58) Field of Search ................................ 524/502, 524, 524/458, 460

(56) References Cited

U.S. PATENT DOCUMENTS

| 3,049,500 A | | 8/1962 | Howland et al. |
|---|---|---|---|
| 5,093,449 A | | 3/1992 | Durney Cronin et al. |
| 5,294,659 A | * | 3/1994 | Kidder ........................ 524/458 |
| 5,468,788 A | | 11/1995 | Kulich |
| 5,510,399 A | * | 4/1996 | Sauer .......................... 523/335 |
| 5,633,304 A | | 5/1997 | Kulich |

FOREIGN PATENT DOCUMENTS

| EP | 0 143 858 | 6/1985 |
|---|---|---|
| JP | 61-260791 | 5/1988 |

OTHER PUBLICATIONS

Translation of Patent Abstracts of Japan, Publication No. 63–117006 published May 21, 1988.

* cited by examiner

*Primary Examiner*—Robert D. Harlan
(74) *Attorney, Agent, or Firm*—Maria Parrish Tungol

(57) ABSTRACT

A method of preparing a diene rubber latex having large size particles, good stability and reduced coagulum during polymerization wherein the method comprises:

(a) pretreating a seed diene rubber latex with an anionic emulsifier and a non-ionic emulsifier, (b) adjusting the pH of an unsaturated carboxylic acid-containing copolymer latex to about 5 to 11 and adjusting the solids content of the copolymer latex to about 1 to 10% by weight solids content to produce an agglomerating latex solution, and (c) adding the pretreated seed diene rubber latex of step (a) to the agglomerating latex solution of step (b).

Step (c) must be carried out by adding the pretreated seed diene rubber latex to the agglomerating latex. If the agglomerating latex is added to the rubber latex, an undesirable level of coagulum is produced.

14 Claims, No Drawings

METHOD OF PREPARING DIENE LATEX HAVING A LARGE PARTICLE SIZE BY ADDITION OF A PRETREATED SEED LATEX TO AN AGGLOMERATING AGENT

This application is a continuation-in-part of Ser. No. 09/699,311 filed Oct. 27, 2000.

FIELD OF THE INVENTION

The present invention relates to a method for preparing a synthetic rubber latex having a large particle size. More particularly, the present invention relates to a method for preparing a diene rubber latex having a large particle size by pretreating a seed diene rubber latex with anionic and nonionic emulsifiers prior to agglomeration and then adding the pretreated seed diene rubber latex to an agglomerating agent comprised of a copolymer latex that contains unsaturated carboxylic acid monomers.

BACKGROUND OF THE INVENTION

In general, a diene rubber latex having a large particle size is used in preparation of a regular ABS (acrylonitrile-butadiene-styrene) resin, a high-impact ABS (acrylonitrile-butadiene-styrene) resin, a non-glossy ABS resin, a foam rubber and so on. Several methods are known for the preparation of a synthetic rubber latex having a large particle size and these are as follows: (1) regulation of the particle size by controlling the pH value in the polymerization of latex through addition of a base or an acid, (2) addition of an inorganic electrolyte or an emulsifier during polymerization, (3) agglomeration of the latex by freezing, and (4) mechanical or chemical agglomeration of the synthetic rubber latex particles after polymerization.

These methods have been known and applied up to now. However, these methods are disadvantageous because methods (1) and (2) require a long polymerization time and methods (3) and (4) produce undesirably large amounts coagulum.

In order to overcome the shortcomings above and prepare a synthetic rubber latex with a uniform particle size, Japanese Patent Laid-open No.63-117006 discloses a method of preparing a stable synthetic rubber latex by lowering pH of the latex to 6 or below, adding a polymeric coagulant having both polar and nonpolar groups in the molecule to the small-particle diameter polymer latex formed by emulsion polymerization by using an emulsifier based on an emulsifier which decreases in surface activity in an acidic condition, and adding an acid. However, in the polymerization of graft-ABS by using the synthetic rubber latex, it is difficult to collect the polymer.

U.S. Pat. No. 3,049,500 discloses a process of increasing the particle of a diene latex wherein a polyvinyl methyl ether containing an alkali salt electrolyte is added to the diene latex.

U.S. Pat. No. 6,365,669 discloses a method of preparing a polybutadiene latex by adding a surfactant to the latex when the conversion rate of the butadiene monomer greater than 80% and then adding an agglomerating agent to the polymerization mixture wherein the temperature of the polymerization mixture is raised about 5 to about 20° C. higher than the polymerization temperature during the agglomerating step.

U.S. Pat. Nos. 5,468,788 and 5,633,304 disclose a process for agglomerating small rubber particles in an aqueous latex to form large rubber particles, the process involving the addition of a water soluble organic acid and a water organic anhydride to the latex prior to agglomeration of the rubber particles to facilitate agglomeration of the rubber particles into large rubber particles which are essentially free of coagulum. However, in the process involving the addition of a water soluble organic acid and a water organic anhydride, a little coagulum still occurs, which has been a target to the research and development of agglomeration of rubber particles. Further, in case small particle size latex ("PASS latex") is prepared in a large amount, the latex is not uniform because a bimodal type latex is formed. Such latex cannot be utilized for applications requiring uniform distribution of the latex.

Copending Ser. No. 09/699,311, herein incorporated by reference, discloses a process of preparing a synthetic rubber latex having a large particle size by adding a pretreated seed diene rubber latex to an agglomerating agent comprised of a copolymer latex containing unsaturated carboxylic acid monomers.

The present inventors have developed a method of preparing a diene rubber latex which has a large particle size, and, compared to the process of Ser. No. 09/699,311, has better stability and less coagulum during polymerization, and more uniform particle size.

SUMMARY OF THE INVENTION

The present invention provides a method of preparing a diene rubber latex having large size particles, good stability and reduced coagulum during polymerization wherein the method comprises:

(a) pretreating a seed diene rubber latex with an anionic emulsifier and a non-ionic emulsifier, (b) adjusting the pH of an unsaturated carboxylic acid-containing copolymer latex to about 5 to 11 and adjusting the solids content of the copolymer latex to about 1 to 10% by weight solids content to produce an agglomerating latex solution, and (c) adding the pretreated seed diene rubber latex of step (a) to the agglomerating latex solution of step (b).

Step (c) must be carried out by adding the pretreated seed diene rubber latex to the agglomerating latex. If the agglomerating latex is added to the rubber latex, an undesirable level of coagulum is produced.

DETAILED DESCRIPTION OF THE INVENTION

The present invention provides a method of preparing a diene rubber latex having large size particles, good stability and reduced coagulum during polymerization. The method of preparing a diene rubber latex having large size particles according to the present invention comprises: (a) pretreating a seed diene rubber latex with an anionic emulsifier and a non-ionic emulsifier, (b) preparing a copolymer latex by polymerization of unsaturated carboxylic acid monomer and then treating the copolymer latex with a pH adjusting agent to produce an agglomerating latex solution having a solids content of about 1 to 10% by weight and a pH of about 5 to 11, (c) adding the pretreated seed synthetic rubber latex of step (a) to the agglomerating latex solution of step (b). Step (c) must be carried out by adding the pretreated seed diene rubber latex to the agglomerating latex solution. If the agglomerating latex solution is added to the rubber latex, an undesirable level of coagulum is produced. Optionally, an anti-foaming agent may be added in step (a) to remove undesirable foam formed by residual volatile components and emulsifier that may be present in the rubber latex.

Step (a): Pretreatment of Seed Diene Rubber Latex

Known seed diene rubber latices can be used in the method according to the present invention. Such latices can be prepared by any conventional emulsion polymerization process. Known seed diene rubber latices that can be used in the method of the present invention include but are not limited to the seed diene latices disclosed in U.S. Pat. Nos. 3,049,500, 6,365,669, and 5,468,788 and 5,633,304 all of which are herein incorporated by reference. Preferred diene rubber latices are polybutadiene, butadiene-styrene copolymer, butadiene-α-methyl styrene copolymer, butadiene-acrylate copolymer, and butadiene-methacrylate copolymer.

It is preferable that the seed diene rubber latex has a solids content of from about 30 to about 50% by weight. It is preferable that the seed diene rubber latex has particle sizes from about 700 to about 1,500 Å. When the range of the particle size is between about 700 to about 1,500 Å, it is easier to control the average particle size of the latex to between about 2,000 to about 5,000 Å after agglomeration. If necessary, it is desirable to adjust the pH value of the seed diene rubber latex to greater than about 7.0 prior to the agglomeration step. If the pH of the agglomerating latex is higher than that of the seed diene rubber latex, the agglomerating effect is rapidly decreased. Therefore, it is desirable to adjust the pH value of the seed diene rubber latex to equal or higher value than that of the agglomerating agent in order to maximize the agglomerating effect. In addition, since a grafted ABS copolymer is polymerized at pH 10–12, it is preferable to adjust the pH value of the seed diene rubber latex to greater than 7.0. If the pH value is lower than 7.0, a undesirably large amount of pH adjusting agent would be required which would lead to a large amount of coagulum during the polymerization to produce the ABS copolymer.

In a preferred embodiment, the seed synthetic rubber latex having a solids content of from about 30 to about 50% by weight is pretreated by mixing a diene rubber latex, an anionic emulsifier, a non-ionic emulsifier, deionized water, and optionally an anti-foaming agent.

Anionic Emulsifiers

As used herein, anionic emulsifiers means anionic emulsifiers that are compatible emulsifiers for seed diene rubber latices and produce diene rubber latices with large size particles, good stability and reduced coagulum during polymerization when used in the method of the present invention. However, "anionic emulsifier" as used herein does not include sodium diisobutyl sulfosuccinate or sodium dicyclohexyl sulfosuccinate which produce a large amount of coagulum when used in the method of the present invention. The anionic emulsifier added in step (a) is in addition to any anionic emulsifier that is used in the preparation of the seed diene rubber latex. Suitable types of anionic emulsifiers include alkylsulfates, alkylarylsulfates, alkylaryl sulfonates, alkyl sulfosuccinate and alkylaryl sulfosuccinate salts and sulfosuccinate salts of ethoxylated alcohol or alkylphenol.

Fatty acid salts can also be used. However, when used in the specification and claims, "fatty acid salts" does not include sorbitan mono-oleate. When sorbitan mono-oleate is used, coagulations occurs during polymerization due to the low HLB (Hydrophilic Lipophilic Balance). Anionic emulsifiers that can be used in the present invention are known in the art, e.g., they are disclosed in previously referenced U.S. Pat. Nos. 3,049,500, 6,365,669, and 5,468,788 and 5,633,304. Suitability of specific anionic emulsifiers can be readily determined by one skilled in the art given the disclosure of the present invention.

Representative examples of the anionic emulsifier suitable for use in the method of the present invention include rosin acid soap, sodium lauryl sulfate, sodium oleate, potassium oleate, sodium dodecyl benzene sulfonate, sodium dodecyl allyl sulfosuccinate, disodium ethoxylated nonyl phenol half ester of sulfosuccinic acid, disodium ethoxylated alcohol half ester of sulfosuccinic acid, sodium dioctyl sulfosuccinate, and disodium mono- and didodecyl diphenyl oxide disulfate. Preferred anionic emulsifiers are rosin acid soap, sodium lauryl sulfate, sodium dodecyl benzene sulfonate, disodium ethoxylated nonylphenol half ester of sulfosuccinis acid, and potassium oleate.

Nonionic Emulsifiers

As used herein, nonionic emulsifiers means nonionic compounds or polymers that are compatible emulsifiers for seed diene rubber latices and produce diene rubber latices with large size particles, good stability and reduced coagulum during polymerization when used in the method of the present invention. The nonionic emulsifier added in step (a) is in addition to any nonionic emulsifier that is used in the preparation of the seed diene rubber latex. Suitable types of nonionic emulsifiers are known in the art and include alkylene oxide emulsifiers. Suitability of specific nonionic emulsifiers can be readily determined by one skilled in the art given the disclosure of the present invention.

Preferred nonionic emulsifiers are ethylene oxide-propylene oxide copolymers (ethylene glycol-propylene glycol block polymers), polyoxyethylene octylphenyl ethers, and polyoxyethylene nonylphenyl ethers. The amount of the anionic and nonionic emulsifiers added in the method of the present invention is typically about 2.0 to 6.0% by weight per 100% of the weight of the seed diene rubber latex. The weight ratio of anionic emulsifier to non-ionic emulsifier is between about 1:9 to 9:1 respectively, more preferably between about 2:8 to 8:2.

Anti-foaming Agent

Optionally, an anti-foaming agent may be added to remove any undesirable foam formed by residual volatile components and emulsifier that may be present in the rubber latex. If foam is present and is not sufficiently removed, a micro-foam can act as a seed during agglomeration which can produce an undesirably large amount of coagulum. Anti-foaming agents for removing foam from seed diene rubber latices are known in the art. Representative examples of the anti-foaming agent usable in the method of the present invention include fatty alcohols, fatty acid esters, phosphate esters, and a silicone oil emulsion. Silicone oil emulsion is the preferred anti-foaming agent. If an anti-foaming agent is used, the seed diene rubber latex is typically first treated with the emulsifiers and then with the anti-foaming agent. The anti-foaming agent is preferably used in the amount of about 0.05 to about 5.0% by weight per 100% by weight of the seed diene rubber latex to achieve the desired effect.

Step (b): Preparation of the Unsaturated Carboxylic Acid-Containing Copolymer Latex and Agglomerating Latex In accordance with the present invention, an unsaturated carboxylic acid-containing copolymer latex is used as an agglomerating latex. The unsaturated carboxylic acid-containing copolymer latex is a copolymer latex that is prepared by polymerizing an unsaturated carboxylic acid monomer with a monomer that is polymerizable with the acid monomer. Such copolymer latices are known in the art. The unsaturated carboxylic acid monomer is an unsaturated $C_1$ to $C_{12}$ carboxylic acid. Suitable carboxylic acids include acrylic acid, methacrylic acid, methyl acrylic acid, itaconic acid, crotonic acid, fumaric acid, and maleic acid.

Monomers polymerizable with the unsaturated carboxylic acid monomer are known in the art and include acrylates such as methyl methacrylate, methyl acrylate and ethyl acrylate; $C_{4-6}$ conjugated dienes such as butadiene and isoprene; monovinyl aromatic compounds such as styrene, α-methyl styrene, vinyl-toluene and chlorostyrene; and acrylic monomers such as acrylonitrile and methacrylonitrile.

The copolymer latex is prepared by a conventional emulsion polymerization process. The copolymer latex contains about 1~50% by weight of carboxylic acid monomer units, preferably about 10~30% by weight, for stability of the diene rubber latex having a large particle size. The solids content of the unsaturated carboxylic acid-containing copolymer latex prior to production of the agglomerating latex solution is typically about 10 to 50% by weight, preferably from about 30 to about 50% by weight, based on the total weight of the copolymer latex.

To produce the agglomerating latex, the solids content of the copolymer latex is adjusted to about 1 to 10% by weight by the addition of deionized water and a pH adjusting agent. The pH of the copolymer latex is adjusted to about 5 to 11 by means of pH adjusting agent. The pH adjusting agents that can be used to adjust the solids content and pH of the copolymer latex are known in art and can be easily selected by one skilled in the art. Examples of pH adjusting agents that are typically used in the present invention are NaOH and KOH.

The agglomerating latex is preferably used as an agglomerating agent in an amount from about 0.1 to about 10 parts by weight per 100 parts by weight of solids content of the seed diene rubber latex. More preferably, the agglomerating latex is used in the range from about 0.2 to about 5 parts by weight per 100 parts by weight of solids content of the seed diene rubber latex.

Step (c): Producing Diene Rubber Latex Having Large Particle Size

The diene rubber latex having large rubber particles can be prepared by adding the pretreated seed synthetic rubber latex of step (a) to the agglomerating latex of step (b) after pretreatment step (a). Step (c) must be carried out by adding the pretreated seed diene rubber latex to the agglomerating latex. If the agglomerating latex is added to the rubber latex, an undesirable level of coagulum is produced.

In a typical process, the seed diene latex is slowly added to the agglomerating agent while agitation keeps going. Step (c) may be carried out by adding the pretreated seed diene rubber latex dropwise to the agglomerating latex over a period of about 30 minutes to about 1 hour.

The present invention will be described in more detail by the following Examples. The Examples are given only to illustrate the present invention and not intended in any way to limit the scope of the invention.

EXAMPLES

Examples 1–4

(1) Preparation and Pretreatment of Seed Diene Rubber Latex

Preparation of Seed Diene Rubber Latex

A seed diene rubber latex was prepared by polymerizing 100 parts by weight of butadiene, 0.7 part by weight of t-dodecylmercaptan (t-DDM), 3.0 parts by weight of alkylbenzenesulfonate, 1.0 part by weight of potassium carbonate and 0.3 part by weight of potassium persulphate in 150 parts by weight of deionized water at the reaction temperature of 70° C. for 9 hours. The seed diene rubber latex had an average particle size of 1250 Å.

Pretreatment of Seed Diene Rubber Latex

Six reactors were prepared with 100 parts by weight of the seed diene rubber latex with 45% by weight of solid content per reactor. To the each reactor were added an anionic emulsifier (AEROSOL A-103, disodium ethocylated nonylphenol half ester of sulfosuccinic acid) and a non-ionic emulsifier (PLURONIC F-68, a block copolymer comprised of 81% polyethylene glycol and 19% polypropylene glycol) in the amounts as shown in Table 1. Then the seed synthetic rubber latex was pretreated with 0.1 parts by weight of an anti-foaming agent (ANTIFOAM E-20 by KAO company of Japan) in each reactor to prepare the pretreated seed diene rubber latex of Examples 1–4.

(2) Preparation of Agglomerating Latex

Preparation of Unsaturated Carboxylic Acid-Containing Copolymer Latex: A copolymer latex was prepared by polymerizing 40 parts by weight of butadiene, 20 parts by weight of methacrylic acid, 40 parts by weight of ethyl acrylate, 5.0 parts by weight of potassium oleate, 0.5 part by weight of potassium carbonate and 0.5 part by weight of potassium persulfate in 185 parts by weight of deionized water, for 6 hours at 70° C. The resulting copolymer latex had an average particle size of 700 Å, a solids content of 35% by weight and a pH of 2.5.

Preparation of Agglomerating Latex: 100 parts by weight of the unsaturated carboxylic acid-containing copolymer latex with 35% solids content was mixed with 1,500 g of deionized water and potassium hydroxide to adjust the pH to 7.0±0.2.

(3) Preparation of Synthetic Rubber Latex Having Large Size Particles

In a 10 liter reactor, the pretreated seed diene rubber latex was added dropwisely to the agglomerating latex with agitation with 150 rpm for two hours. The diene rubber latexes of Examples 1–4 were prepared in the manner described above. The particle sizes of the synthetic rubber latexes were measured 4, 24 and 96 hours after agglomeration, respectively. The particle sizes were measured with NICOMP 370 (a particle size analyzer). The particle sizes and coagulum contents are shown in Table 1.

Comparative Examples 1–2

Comparative Examples 1–2 were conducted in the same manner as in Example 1 except that an anionic emulsifier or a non-ionic emulsifier was used alone.

TABLE 1

|  |  | Aerosol A-103/ Pluronic F-68 | rubber particle size (Å) | | | coagulum |
|---|---|---|---|---|---|---|
|  |  | (wt. parts) | 4 hours | 24 hours | 96 hours | (wt %) |
| Example | 1 | 0.8/0.2 | 2644 | 2679 | 2708 | 0.02 |
|  | 2 | 0.6/0.4 | 2601 | 2611 | 2598 | 0.01 |
|  | 3 | 0.4/0.6 | 2638 | 2652 | 2674 | 0.02 |
|  | 4 | 0.2/0.8 | 3151 | 3191 | 3379 | 0.68 |
| Comp. Example | 1 | 1.0/0.0 | 2598 | 2872 | 3529 | 1.25 |
|  | 2 | 0.0/1.0 | 3617 | 3855 | 4362 | 4.89 |

Various changes and modifications can be made to the present invention without departing from the spirit and scope of the present invention.

What is claimed is:

1. A method of preparing a diene rubber latex having large size particles comprising:

(a) pretreating a seed diene rubber latex with an anionic emulsifier and a non-ionic emulsifier prior to agglomeration of the seed diene rubber latex, (b) adjusting the pH of an unsaturated carboxylic acid-containing copolymer latex to about 5 to 11 and adjusting the solids content of the copolymer latex to about 1 to 10% by weight solids content to produce an agglomerating latex solution, and (c) adding the pretreated seed diene rubber latex of step (a) to the agglomerating latex solution of step (b).

2. The method of claim 1 wherein the unsaturated acid-containing copolymer latex has a solids content of about 10 to 50% by weight prior to adjustment of the solids content and pH to produce the agglomerating latex solution.

3. The method of claim 1 wherein the seed diene rubber latex has particle sizes from about 700 to about 1,500 Å and a solids content of from about 30 to about 50% by weight.

4. The method of claim 1 wherein the pH of the seed diene rubber latex is adjusted to a value greater than 7.0 prior to step (b).

5. The method of claim 1 wherein the seed diene rubber latex is selected from the group consisting of polybutadiene, butadiene-styrene copolymer, butadiene-α-methyl styrene copolymer, butadiene-acrylate copolymer, butadiene-methacrylate copolymer, and mixtures thereof.

6. The method of claim 1 wherein the weight ratio of the anionic emulsifier to the non-ionic emulsifier is between 1:9 to 9:1 respectively.

7. The method of claim 1 wherein said anionic emulsifier rosin acid is selected from the group consisting of rosin soap, sodium lauryl sulfate, sodium oleate, potassium oleate, sodium dodecyl benzene sulfonate, sodium dodecyl allyl sulfosuccinate, disodium ethoxylated nonyl phenol half ester of sulfosuccinic acid, disodium ethoxylated alcohol half ester of sulfosuccinic acid, sodium dioctyl sulfosuccinate, and disodium mono- and didodecyl diphenyl oxide disulfate.

8. The method of claim 1 wherein said non-ionic emulsifier rosin acid is selected from the group consisting of ethylene oxide-propylene oxide copolymers, polyoxyethylene octylphenyl ethers, and polyoxyethylene nonylphenyl ethers.

9. The method of claim 1 wherein said anti-foaming agent is selected from the group consisting of fatty alcohols, fatty acid esters, phosphate esters, and a silicone oil emulsion.

10. The method of claim 1 wherein said anti-foaming agent is used in an amount of about 0.05 to about 5.0% by weight based on the total weight of reactants.

11. The method of claim 1 wherein said unsaturated acid-containing copolymer latex is prepared by polymerizing an unsaturated $C_{1-12}$ carboxylic acid monomer and a monomer polymerizable with the acid monomer.

12. The method of claim 11 wherein said unsaturated carboxylic acid monomer is selected from the group consisting of acrylic acid, methacrylic acid, methyl acrylic acid, itaconic acid, crotonic acid, fumaric acid, and maleic acid.

13. The method of claim 11 wherein the monomer polymerizable with the carboxylic acid monomer is selected from the group consisting of methyl methacrylate, methyl acrylate, ethyl acrylate, butadiene, isoprene, styrene, α-methyl styrene, vinyl-toluene, chlorostyrene, acrylonitrile and methacrylonitrile.

14. The method of claim 1 wherein said step (c) is carried out by adding the pretreated seed diene rubber latex dropwise to the agglomerating latex sollution for about 30 minutes to about 1 hour.

* * * * *